US012659098B2

(12) United States Patent
Bai et al.

(10) Patent No.: US 12,659,098 B2
(45) Date of Patent: Jun. 16, 2026

(54) SCHEDULING INFORMATION SENDING METHODS, SCHEDULING INFORMATION RECEIVING METHODS AND APPARATUS

(71) Applicant: Beijing Xiaomi Mobile Software Co., Ltd., Beijing (CN)

(72) Inventors: Yingshuang Bai, Beijing (CN); Yuanyuan Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 446 days.

(21) Appl. No.: 18/269,323

(22) PCT Filed: Dec. 25, 2020

(86) PCT No.: PCT/CN2020/139590
§ 371 (c)(1),
(2) Date: Jun. 23, 2023

(87) PCT Pub. No.: WO2022/134061
PCT Pub. Date: Jun. 30, 2022

(65) Prior Publication Data
US 2024/0322963 A1     Sep. 26, 2024

(51) Int. Cl.
*H04L 5/00*        (2006.01)
*H04B 1/7156*     (2011.01)
*H04L 25/02*      (2006.01)

(52) U.S. Cl.
CPC ......... *H04L 5/0048* (2013.01); *H04B 1/7156* (2013.01); *H04L 25/0204* (2013.01)

(58) Field of Classification Search
CPC .. H04L 5/0048; H04L 25/0204; H04B 1/7156
See application file for complete search history.

(56) References Cited

U.S. PATENT DOCUMENTS

2017/0230992 A1*   8/2017   Patel ................. H04W 72/1268

FOREIGN PATENT DOCUMENTS

CN        101267664 A       9/2008
CN        109219135 A       1/2019
(Continued)

OTHER PUBLICATIONS

Xiaomi, "PUSCH coverage enhancement", 3GPP TSG RAN WG1 #103-e R1-2007640, Nov. 1, 2020, section 2.3.
(Continued)

*Primary Examiner* — Natasha W Cosme
(74) *Attorney, Agent, or Firm* — Volpe Koenig

(57) ABSTRACT

A method for sending scheduling information, performed by a network device. The method includes: receiving channel state information sent from a terminal device, generating a scheduling information according to the channel state information, where the scheduling information includes a current frequency hopping and an adjacent frequency hopping within a time unit, a carrier frequency of the current frequency hopping is located in a coherent bandwidth of the adjacent frequency hopping, and a pilot signal configured on the current frequency hopping or the adjacent frequency hopping is used for channel estimation of the current frequency hopping and/or the adjacent frequency hopping and sending the scheduling information to the terminal device.

18 Claims, 9 Drawing Sheets

(56) References Cited

FOREIGN PATENT DOCUMENTS

| CN | 110149661 A | 8/2019 |
| WO | 2020/030013 A1 | 2/2020 |

OTHER PUBLICATIONS

Spreadtrum Communications. "Potential solutions for PUSCH coverage enhancement", 3GPP TSG RAN WGI #103-e RI-2008092, Nov. 1, 2020, entire document.

ZTE Corporation, "Discussion on potential techniques for PUSCH", 3GPP TSG RAN WG1 #102-e R1-2005427, Aug. 8, 2020, entire document.

* cited by examiner

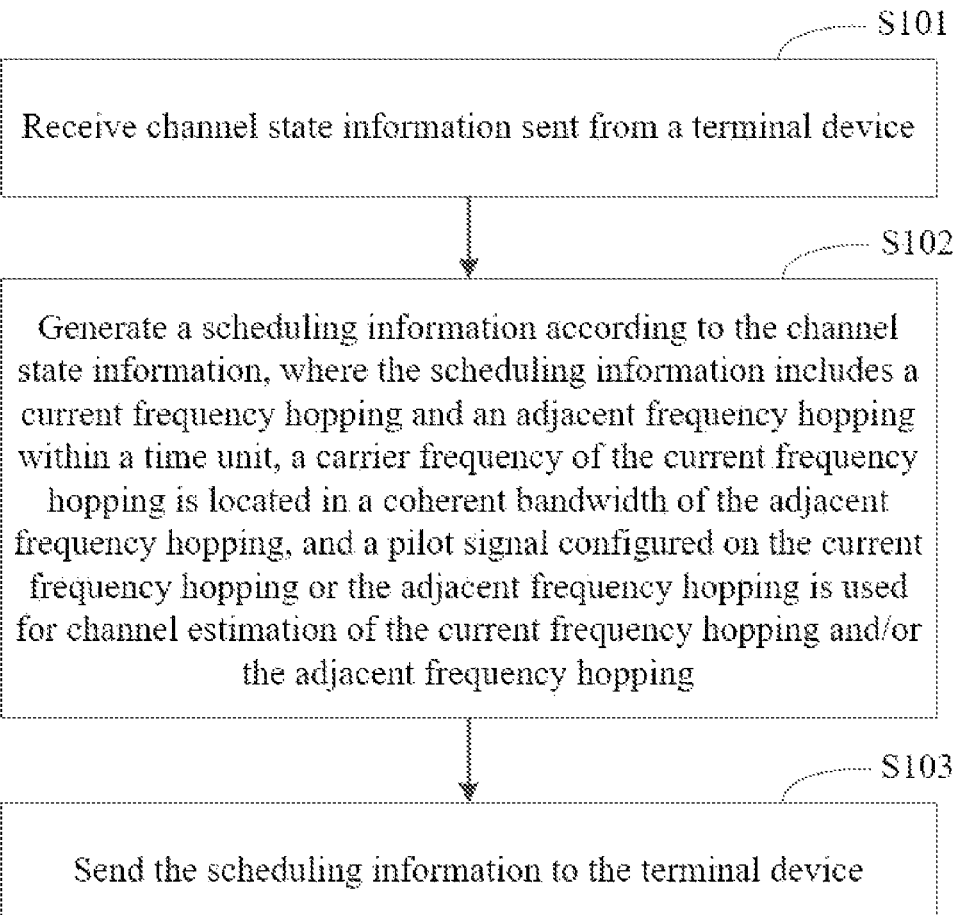

S101

Receive channel state information sent from a terminal device

S102

Generate a scheduling information according to the channel state information, where the scheduling information includes a current frequency hopping and an adjacent frequency hopping within a time unit, a carrier frequency of the current frequency hopping is located in a coherent bandwidth of the adjacent frequency hopping, and a pilot signal configured on the current frequency hopping or the adjacent frequency hopping is used for channel estimation of the current frequency hopping and/or the adjacent frequency hopping

S103

Send the scheduling information to the terminal device

Fig. 1

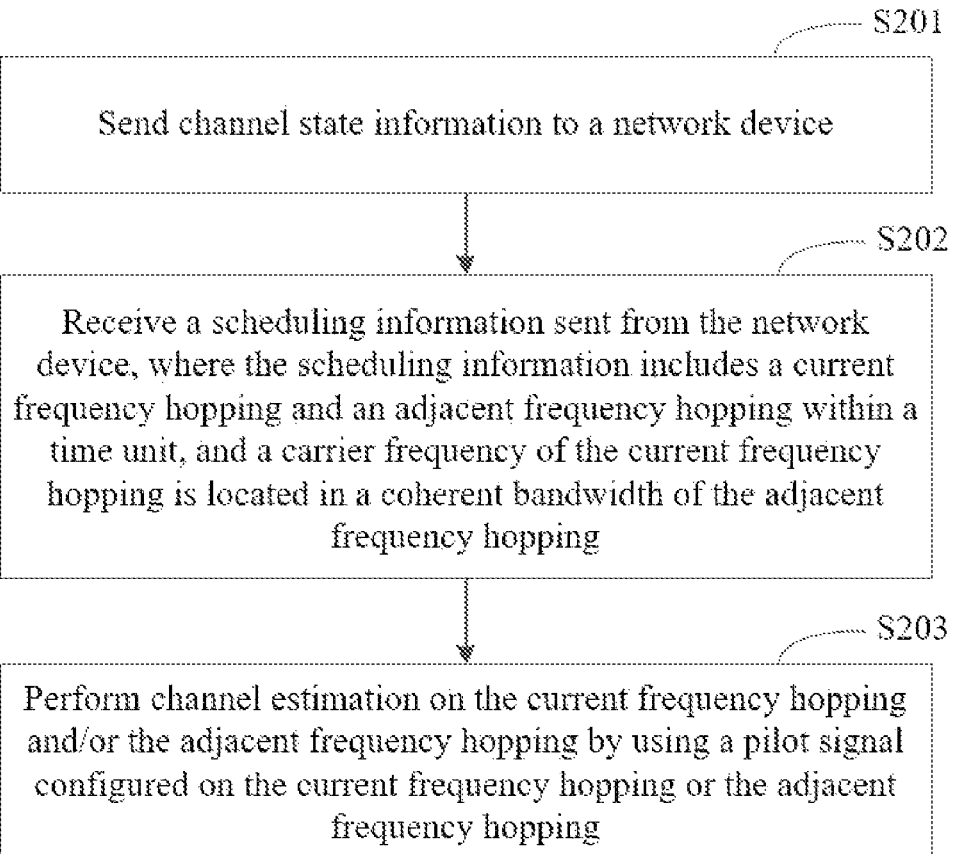

S201

Send channel state information to a network device

S202

Receive a scheduling information sent from the network device, where the scheduling information includes a current frequency hopping and an adjacent frequency hopping within a time unit, and a carrier frequency of the current frequency hopping is located in a coherent bandwidth of the adjacent frequency hopping

S203

Perform channel estimation on the current frequency hopping and/or the adjacent frequency hopping by using a pilot signal configured on the current frequency hopping or the adjacent frequency hopping

Figure 4:
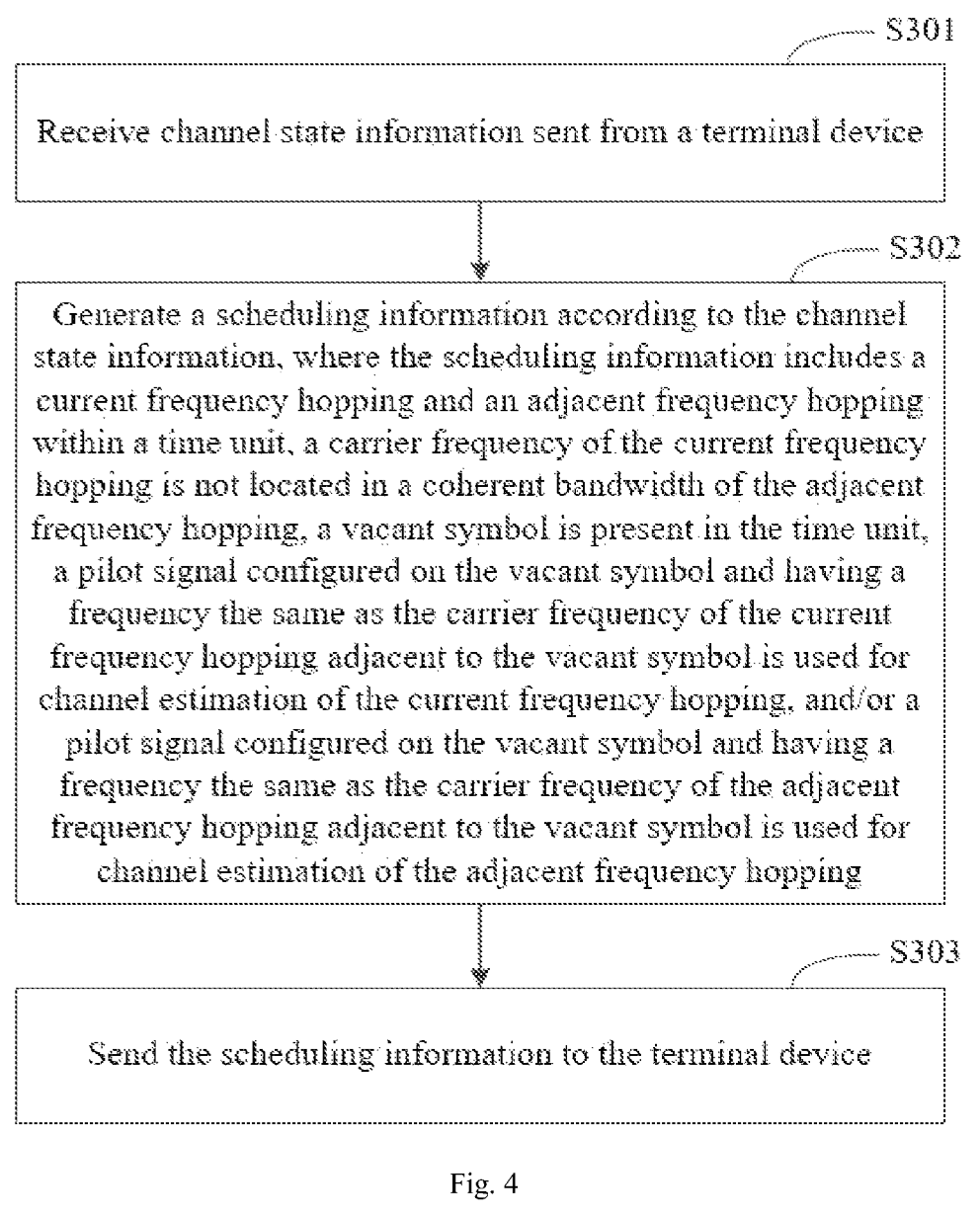

Receive channel state information sent from a terminal device

S302

Generate a scheduling information according to the channel state information, where the scheduling information includes a current frequency hopping and an adjacent frequency hopping within a time unit, a carrier frequency of the current frequency hopping is not located in a coherent bandwidth of the adjacent frequency hopping, a vacant symbol is present in the time unit, a pilot signal configured on the vacant symbol and having a frequency the same as the carrier frequency of the current frequency hopping adjacent to the vacant symbol is used for channel estimation of the current frequency hopping, and/or a pilot signal configured on the vacant symbol and having a frequency the same as the carrier frequency of the adjacent frequency hopping adjacent to the vacant symbol is used for channel estimation of the adjacent frequency hopping

S303

Send the scheduling information to the terminal device

Figure 6:
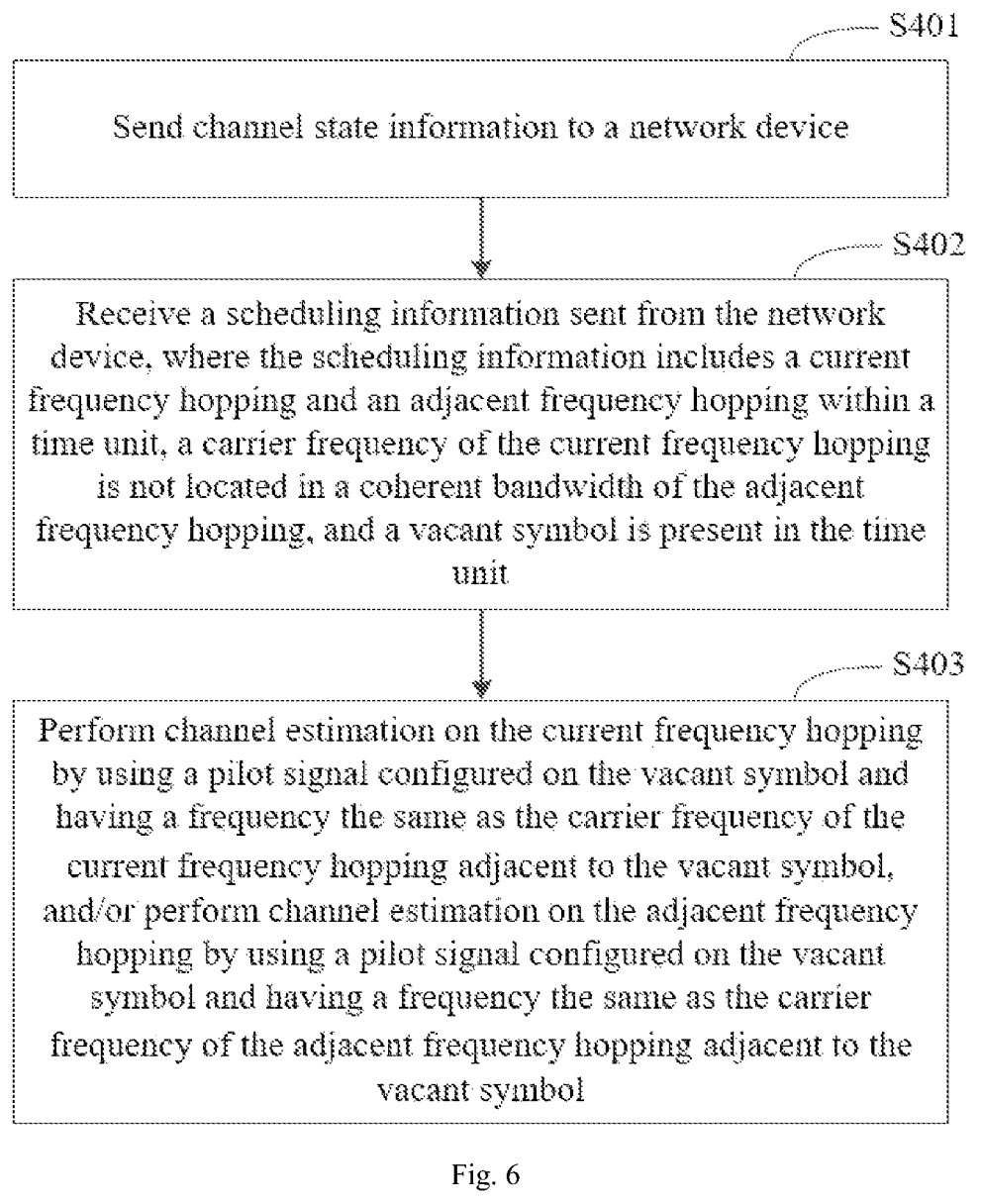

Send channel state information to a network device

S402

Receive a scheduling information sent from the network device, where the scheduling information includes a current frequency hopping and an adjacent frequency hopping within a time unit, a carrier frequency of the current frequency hopping is not located in a coherent bandwidth of the adjacent frequency hopping, and a vacant symbol is present in the time unit

S403

Perform channel estimation on the current frequency hopping by using a pilot signal configured on the vacant symbol and having a frequency the same as the carrier frequency of the current frequency hopping adjacent to the vacant symbol, and/or perform channel estimation on the adjacent frequency hopping by using a pilot signal configured on the vacant symbol and having a frequency the same as the carrier frequency of the adjacent frequency hopping adjacent to the vacant symbol

SCHEDULING INFORMATION SENDING METHODS, SCHEDULING INFORMATION RECEIVING METHODS AND APPARATUS

CROSS-REFERENCE

The present application is a U.S. National Stage of International Application No. PCT/CN2020/139590, filed on Dec. 25, 2020, the contents of all of which are incorporated herein by reference in their entirety for all purposes.

BACKGROUND

Currently, as the network technology evolves, the terminal device needs to perform coverage enhancement in order to satisfy higher requirements of network services for a transmission rate and latency, for example. Two prevailing research directions are to use intra-hopping and inter-hopping to enhance the coverage performance. Despite a greater frequency hopping gain, the inter-hopping also requires a greater bandwidth part (BWP), which increases the complexity of a transceiver. Although the intra-hopping can bring frequency division gain, improve the anti-interference performance of a system in a frequency domain and also improve the transmission concealment of a signal, a configuration method for a pilot signal in the intra-hopping in the related art is relatively single, which consumes numerous pilot signals and reduces the transmission of data information, thus affecting the coverage performance.

SUMMARY

An example of a first aspect of the disclosure provides a method for sending scheduling information, performed by a network device. The method includes: receiving channel state information sent from a terminal device; generating scheduling information according to the channel state information, where the scheduling information includes a current frequency hopping and an adjacent frequency hopping within a time unit, a carrier frequency of the current frequency hopping is located in a coherent bandwidth of the adjacent frequency hopping, and a pilot signal configured on the current frequency hopping or the adjacent frequency hopping is used for channel estimation of the current frequency hopping and/or the adjacent frequency hopping; and sending the scheduling information to the terminal device.

An example of a second aspect of the disclosure provides a method for receiving scheduling information, performed by a terminal device. The method includes: sending channel state information to a network device; receiving scheduling information sent from the network device, where the scheduling information includes a current frequency hopping and an adjacent frequency hopping within a time unit, and a carrier frequency of the current frequency hopping is located in a coherent bandwidth of the adjacent frequency hopping; and performing channel estimation on at least one of the current frequency hopping or the adjacent frequency hopping by using a pilot signal configured on the current frequency hopping or the adjacent frequency hopping.

An example of a third aspect of the disclosure provides another method for receiving scheduling information, performed by a terminal device. The method includes: sending channel state information to a network device; receiving scheduling information sent from the network device, where the scheduling information includes a current frequency hopping and an adjacent frequency hopping within a time unit, a carrier frequency of the current frequency hopping is not located in a coherent bandwidth of the adjacent frequency hopping, and a vacant symbol is present in the time unit; and performing at least one of channel estimation on the current frequency hopping by using a pilot signal configured on the vacant symbol and having a frequency identical to the carrier frequency of the adjacent current frequency hopping adjacent to the vacant symbol, or channel estimation on the adjacent frequency hopping by using a pilot signal configured on the vacant symbol and having the frequency identical to the carrier frequency of the adjacent frequency hopping adjacent to the vacant symbol.

An example of a fourth aspect of the disclosure provides a communication apparatus, including: at least one processor; and a memory communicatively connected to the at least one processor. The memory stores an instruction executable by the at least one processor, and an instruction is executed by the at least one processor to make the at least one processor execute the method for sending the scheduling information according to the example of the first aspect of the disclosure.

An example of a fifth aspect of the disclosure provides another communication apparatus, including: at least one processor; and a memory communicatively connected to the at least one processor. The memory stores an instruction executable by the at least one processor, and an instruction is executed by the at least one processor to make the at least one processor execute the method for receiving the scheduling information according to the example of the second aspect of the disclosure.

An example of a sixth aspect of the disclosure provides another communication apparatus, including: at least one processor; and a memory communicatively connected to the at least one processor. The memory stores an instruction executable by the at least one processor, and the instruction is executed by the at least one processor to make the at least one processor execute the method for receiving the scheduling information according to the example of the third aspect of the disclosure.

An example of a seventh aspect of the disclosure provides a non-transitory computer-readable storage medium storing a computer instruction. The computer instruction is configured to make a computer execute the method for sending the scheduling information according to the example of the first aspect of the disclosure.

An example of an eighth aspect of the disclosure provides another non-transitory computer-readable storage medium storing a computer instruction. The computer instruction is configured to make a computer execute the method for receiving the scheduling information according to the example of the second aspect of the disclosure.

An example of a ninth aspect of the disclosure provides another non-transitory computer-readable storage medium storing a computer instruction. The computer instruction is configured to make a computer execute the method for receiving the scheduling information according to the example of the third aspect of the disclosure.

Advantages and additional aspects of the disclosure will partially be set forth in the following description, will partially become apparent from the following description, or will be learned by practice of the disclosure.

BRIEF DESCRIPTION OF THE DRAWINGS

The foregoing and/or additional aspects and advantages of the disclosure will become apparent and readily appreciated from the following description of the examples in conjunction with the accompanying drawings.

FIG. 1 is a schematic flowchart of a method for sending scheduling information according to an example of the disclosure.

FIG. 3 is a schematic flowchart of a method for receiving scheduling information according to an example of the disclosure.

FIG. 4 is a schematic flowchart of another method for sending scheduling information according to an example of the disclosure.

FIG. 6 is a schematic flowchart of another method for receiving scheduling information according to an example of the disclosure.

DETAILED DESCRIPTION

Figure 2:
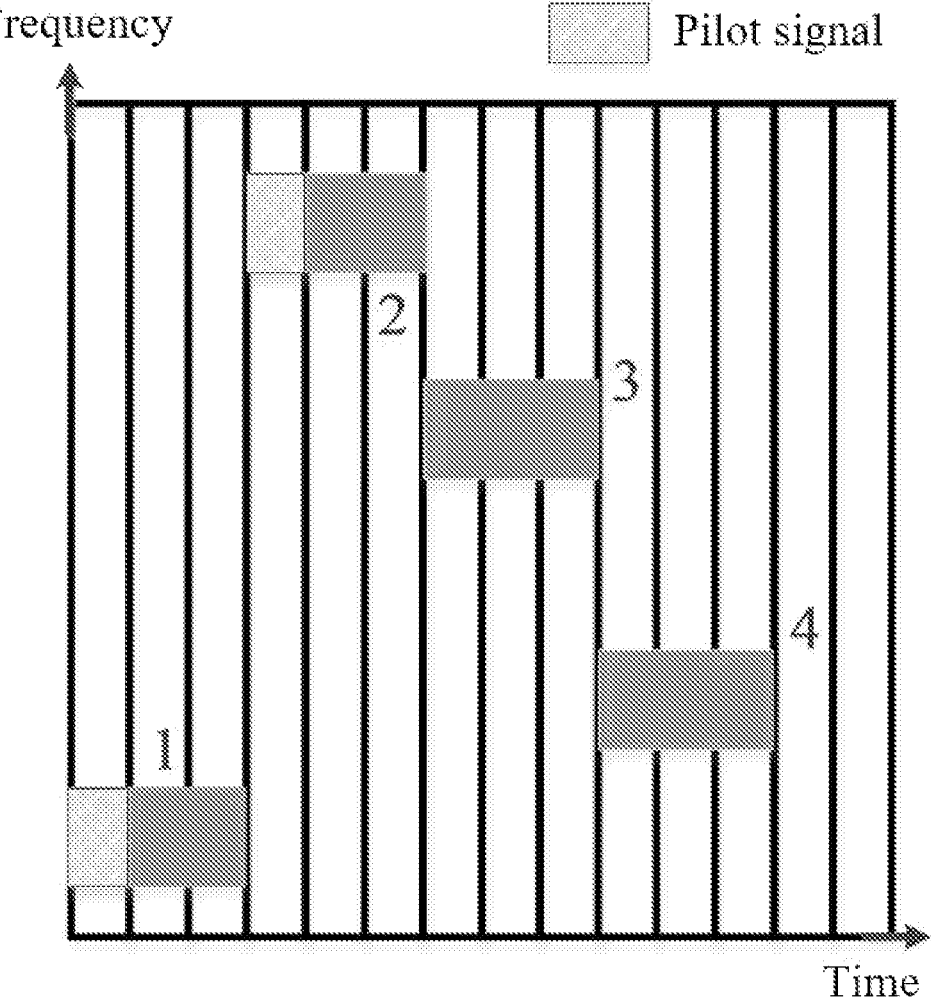
FIG. 2 is a schematic diagram of a method for sending scheduling information according to an example of the disclosure.

Examples of the disclosure are described in detail below, and instances of the examples are illustrated in the drawings, in which same or similar reference numerals refer to the same or similar elements or elements having the same or similar function throughout. The examples described below by reference to the drawings are illustrative for explaining the disclosure and are not to be construed as limiting the disclosure.

The disclosure relates to the field of communication, in particular to a method and apparatus for sending scheduling information, and a method and apparatus for receiving scheduling information.

A method and apparatus for sending scheduling information, a method and apparatus for receiving scheduling information, a network device, a terminal device, a communication apparatus and a storage medium provided in the disclosure are configured to solve the problem in the related art that a configuration method for a pilot signal in intra-hopping is relatively simple and consumes numerous pilot signals.

The examples of the disclosure relate to a network device, which is described as follows: the network device is deployed in a wireless access network to provide a terminal device with a wireless access function. The network device may be a base station (BS). The network device may be in wireless communication with the terminal device by means of one or more antennas. The network device may provide communication coverage for a geographic region in which the network device is located. The base station may include a macro site, a micro base station, a relay station, an access point, etc. in various types. In some examples, the base station may be referred to by those skilled in the art as a base transceiver station, a wireless base station, an access point, a wireless transceiver, a basic service set (BSS), an extended service set (ESS), a NodeB, an evolved NodeB (eNB or eNodeB), or some other suitable terms. For instance, in a fifth-generation (5G) system, the base station is referred to as a gNB. For ease of description, in the examples of the disclosure, apparatuses for providing a wireless communication function for a terminal device are generally referred to as network devices.

The examples of the disclosure relate to a terminal device, which is described as follows: the terminal device may be dispersed throughout a mobile communication system, and each terminal device may be stationary or mobile. The terminal device may also be referred to by those skilled in the art as a mobile station, a subscriber station, a mobile unit, a subscriber unit, a wireless unit, a remote unit, a mobile device, a terminal device, a wireless device, a wireless communication device, a remote device, a mobile subscriber station, an access terminal device, a mobile terminal device, a wireless terminal device, a remote terminal device, a handheld device, a user agent, a mobile client, a client, or some other suitable terms. The terminal device may be a cellular phone, a personal digital assistant (PDA), a wireless modem, a wireless communication device, a handheld device, a tablet computer, a laptop computer, a cordless phone, a wireless local loop (WLL) station, etc., and can communicate with a base station in a mobile communication system.

FIG. 1 is a schematic flowchart of a method for sending scheduling information according to an example of the disclosure, executed by a network device. As shown in FIG. 1, the method for sending scheduling information includes steps S101-S103.

S101, receive channel state information sent from a terminal device.

In the examples of the disclosure, the network device may receive the channel state information (CSI) sent from the terminal device. Alternatively, the channel state information includes, but is not limited to, a decay factor of a signal on each channel, for instance, may include a value of each element in a channel gain matrix, such as information about signal scattering, environment fading, and a power decay with distance, which is not limited here.

Next, in S102, generate scheduling information according to the channel state information. The scheduling information includes a current frequency hopping and an adjacent frequency hopping within a time unit, a carrier frequency of the current frequency hopping is located in a coherent bandwidth of the adjacent frequency hopping, and a pilot signal configured on the current frequency hopping or the adjacent frequency hopping is used for channel estimation of the current frequency hopping and/or the adjacent frequency hopping.

In the examples of the disclosure, the network device may generate the scheduling information according to the channel state information. The scheduling information includes a current frequency hopping and an adjacent frequency hopping within a time unit, a carrier frequency of the current frequency hopping is located in a coherent bandwidth of the adjacent frequency hopping, and a pilot signal configured on the current frequency hopping or the adjacent frequency hopping is configured to channel estimation of the current frequency hopping and/or the adjacent frequency hopping. The time unit includes, but is not limited to, a slot, a transmission time interval (TTI), etc., which is not limited here.

In the examples of the disclosure, the type of the pilot signal is not limited. For instance, the pilot signal includes, but is not limited to, a demodulation reference signal (DMRS), a sounding reference signal (SRS), etc. Moreover, the type of the channel where the time unit is located is not limited either. For instance, the time unit may be a time unit in a physical uplink shared channel (PUSCH), and may also be a time unit in a physical uplink control channel (PUCCH), etc.

The coherent bandwidth is an important parameter characterizing a multipath channel, and refers to a specific frequency range, and any two frequency components in this frequency range have a strong amplitude correlation. That is, in the coherent bandwidth, the multipath channel has a constant gain and a linear phase. It can be understood that, in the examples of the disclosure, the carrier frequency of the current frequency hopping is located in the coherent bandwidth of the adjacent frequency hopping, which indicates that the correlation between the current frequency hopping and the adjacent frequency hopping is strong, and the frequency domain characteristics of the current frequency hopping and the frequency domain characteristics of the adjacent frequency hopping have a high similarity, or have an obvious change rule.

In the examples of the disclosure, a carrier frequency of the current frequency hopping is located in a coherent bandwidth of the adjacent frequency hopping, and a pilot signal configured on the current frequency hopping or the adjacent frequency hopping is used for channel estimation of the current frequency hopping and/or the adjacent frequency hopping. That is, the pilot signal needs to be configured on the current frequency hopping or the adjacent frequency hopping, such that the current frequency hopping and the adjacent frequency hopping share the pilot signal, and the pilot signal configured on the current frequency hopping or the adjacent frequency hopping may be used for channel estimation of the current frequency hopping or the adjacent frequency hopping. In this way, the current frequency hopping and the adjacent frequency hopping share the pilot signal, which can effectively reduce the number of pilot signals and improve the transmission of data information, so as to improve coverage performance.

Alternatively, a pilot signal is configured on a symbol of the adjacent frequency hopping, and a pilot signal is not configured on a symbol of the current frequency hopping. In this way, the pilot signal needs to be configured on the symbol of the adjacent frequency hopping, such that the current frequency hopping and the adjacent frequency hopping share the pilot signal, and the pilot signal configured on the adjacent frequency hopping may be used for channel estimation of the current frequency hopping or the adjacent frequency hopping.

For instance, a pilot signal for channel estimation of an adjacent frequency hopping may be configured on a symbol of the adjacent frequency hopping, and no pilot signal for channel estimation of a current frequency hopping may be configured on a symbol of the current frequency hopping.

Furthermore, density of pilot signals of the adjacent frequency hopping at the beginning and the end of a frequency domain may also be configured to be greater than density of pilot signals of the adjacent frequency hopping at the middle of the frequency domain. In this way, the method makes the density of the pilot signals of the adjacent frequency hopping at the beginning and the end of the frequency domain higher, which helps to enhance accuracy of channel estimation of the adjacent frequency hopping and/or the current frequency hopping. Moreover, the density of the pilot signals of the adjacent frequency hopping at the middle of the frequency domain is lower, which helps to improve a transmission efficiency of data information of the adjacent frequency hopping in the middle of the frequency domain.

In the examples of the disclosure, the number of frequency hopping in the time unit, the number of occupy symbols for each frequency hopping in the time unit, the number of vacant symbols in the time unit, etc. are not limited. It can be understood that at least 2 frequency hopping may be included in 1 time unit, the number of occupy symbols for each frequency hopping in the time unit is at least one, and the number of vacant symbols in the time unit may be 0, and may also be 1 or more.

As shown in FIG. 2, with the frequency hopping in a Type A repetition mode in the time unit as an instance, one time unit may include 4 frequency hopping, which are frequency hopping 1 to 4 respectively, the number of occupy symbols for each frequency hopping in the time unit is 3, and the number of vacant symbols in the time unit is 2. Assuming that a carrier frequency of the frequency hopping 3 is located within a coherent bandwidth of the frequency hopping 2, a carrier frequency of the frequency hopping 4 is located within a coherent bandwidth of the frequency hopping 1, pilot signals are configured on symbols of the frequency hopping 1 and 2, and no pilot signals are configured on symbols of the frequency hopping 3 and 4, the pilot signal of the frequency hopping 1 is used for channel estimation of the frequency hopping 1 and/or the frequency hopping 4, and the pilot signal of the frequency hopping 2 is used for channel estimation of the frequency hopping 2 and/or the frequency hopping 3.

In returning to FIG. 1, in S103, send the scheduling information to the terminal device.

In the examples of the disclosure, a network device may send the scheduling information to the terminal device, such that the terminal device may transmit data according to the scheduling information.

According to the method for sending scheduling information in the examples of the disclosure, the method includes: receiving channel state information sent from a terminal device; generating scheduling information according to the channel state information, where the scheduling information includes a current frequency hopping and an adjacent frequency hopping within a time unit, a carrier frequency of the current frequency hopping is located in a coherent bandwidth of the adjacent frequency hopping, and a pilot signal configured on the current frequency hopping or the adjacent frequency hopping is used for channel estimation of the current frequency hopping and/or the adjacent frequency hopping; and send the scheduling information to the terminal device. In this way, when a carrier frequency of the current frequency hopping is located in a coherent bandwidth of the adjacent frequency hopping, a pilot signal configured on the current frequency hopping or the adjacent frequency hopping is used for channel estimation of the current frequency hopping and/or the adjacent frequency hopping. In other words, the current frequency hopping and the adjacent frequency hopping can share a pilot signal, which can effectively reduce the number of pilot signals and improve the transmission of data information, so as to improve coverage performance.

FIG. 3 is a schematic flowchart of a method for receiving scheduling information according to an example of the disclosure, executed by a terminal device. As shown in FIG. 3, the method for receiving scheduling information includes steps S201-S203.

S201, send channel state information to a network device.

In the examples of the disclosure, the terminal device may send channel state information (CSI) to the network device.

It can be understood that the terminal device may detect a channel state, to obtain the channel state information. Alternatively, the channel state information includes, but is not limited to, a decay factor of a signal on each channel, for instance, may include a value of each element in a channel gain matrix, such as information about signal scattering, environment fading, and a power decay with distance, which is not limited here.

Next, in S202, receive scheduling information sent from the network device, where the scheduling information includes a current frequency hopping and an adjacent frequency hopping within a time unit, and a carrier frequency of the current frequency hopping is located in a coherent bandwidth of the adjacent frequency hopping.

In the examples of the disclosure, the terminal device may receive scheduling information sent from the network device, where the scheduling information includes a current frequency hopping and an adjacent frequency hopping within a time unit, and a carrier frequency of the current frequency hopping is located in a coherent bandwidth of the adjacent frequency hopping. The time unit includes, but is not limited to, a slot, a transmission time interval (TTI), etc., which is not limited here.

In the examples of the disclosure, the type of the channel where the time unit is located is not limited either. For instance, the time unit may be a time unit in a physical uplink shared channel (PUSCH), and may also be a time unit in a physical uplink control channel (PUCCH), etc.

The coherent bandwidth is an important parameter characterizing a multipath channel, and refers to a specific frequency range, and any two frequency components in this frequency range have a strong amplitude correlation. That is, in the coherent bandwidth, the multipath channel has a constant gain and a linear phase. It can be understood that, in the examples of the disclosure, the carrier frequency of the current frequency hopping is located within the coherent bandwidth of the adjacent frequency hopping, which indicates that the correlation between the current frequency hopping and the adjacent frequency hopping is strong, and the frequency domain characteristics of the current frequency hopping and the frequency domain characteristics of the adjacent frequency hopping have a high similarity, or have an obvious change rule.

Finally, in S203, perform channel estimation on at least one of the current frequency hopping or the adjacent frequency hopping by using a pilot signal configured on the current frequency hopping or the adjacent frequency hopping.

In the examples of the disclosure, the terminal device may perform channel estimation on at least one of the current frequency hopping or the adjacent frequency hopping by using a pilot signal configured on the current frequency hopping or the adjacent frequency hopping. That is, the pilot signal needs to be configured on the current frequency hopping or the adjacent frequency hopping, such that the current frequency hopping and the adjacent frequency hopping share the pilot signal, and the pilot signal configured on the current frequency hopping or the adjacent frequency hopping is used for channel estimation of the current frequency hopping or the adjacent frequency hopping. In this way, the current frequency hopping and the adjacent frequency hopping share the pilot signal, which can effectively reduce the number of pilot signals and improve transmission of data information, so as to improve coverage performance.

It is to be noted that in the examples of the disclosure, the type of the pilot signal is not limited. For instance, the pilot signal includes, but is not limited to, a demodulation reference signal (DMRS), a sounding reference signal (SRS), etc.

Alternatively, the pilot signal is configured on a symbol of the adjacent frequency hopping, and a pilot signal is not configured on a symbol of the current frequency hopping. In this way, the pilot signal needs to be configured on the symbol of the adjacent frequency hopping, such that the current frequency hopping and the adjacent frequency hopping share the pilot signal, and the pilot signal configured on the symbol of the adjacent frequency hopping may be used for channel estimation of the current frequency hopping or the adjacent frequency hopping.

Furthermore, the density of pilot signals of the adjacent frequency hopping at the beginning and the end of a frequency domain may also be configured to be greater than the density of pilot signals of the adjacent frequency hopping at the middle of the frequency domain. In this way, the method makes the density of the pilot signals of the adjacent frequency hopping at the beginning and the end of the frequency domain higher, which helps to enhance accuracy of channel estimation of the adjacent frequency hopping and/or the current frequency hopping. Moreover, the density of the pilot signals of the adjacent frequency hopping at the middle of the frequency domain is lower, which helps to improve a transmission efficiency of data information of the adjacent frequency hopping in the middle of the frequency domain.

As shown in FIG. 2, with the frequency hopping in a Type A repetition mode in the time unit as an instance, one time unit may include 4 frequency hopping, which are frequency hopping 1 to 4 respectively, the number of occupy symbols for each frequency hopping in the time unit is 3, and the number of vacant symbols in the time unit is 2. Assuming that a carrier frequency of the frequency hopping 3 is located within a coherent bandwidth of the frequency hopping 2, a carrier frequency of the frequency hopping 4 is located within a coherent bandwidth of the frequency hopping 1, pilot signals are configured on symbols of the frequency hopping 1 and 2, and no pilot signals are configured on symbols of the frequency hopping 3 and 4, the pilot signal configured on the frequency hopping 1 may be used for channel estimation of the frequency hopping 1 and/or the frequency hopping 4, and the pilot signal configured on the frequency hopping 2 may be used for channel estimation of the frequency hopping 2 and/or the frequency hopping 3.

According to the method for receiving scheduling information in the examples of the disclosure, the method includes: sending channel state information to a network device; receiving scheduling information sent from the network device, where the scheduling information includes a current frequency hopping and an adjacent frequency hopping within a time unit, and a carrier frequency of the current frequency hopping is located in a coherent bandwidth of the adjacent frequency hopping; and performing channel estimation on at least one of the current frequency hopping or the adjacent frequency hopping by using a pilot signal configured on the current frequency hopping or the adjacent frequency hopping. In this way, when a carrier frequency of the current frequency hopping is located in a coherent bandwidth of the adjacent frequency hopping, a pilot signal configured on the current frequency hopping or the adjacent frequency hopping is used for channel estimation of the current frequency hopping and/or the adjacent frequency hopping. That is, the current frequency hopping and the adjacent frequency hopping can share a pilot signal, which can effectively reduce the number of pilot signals and improve the transmission of data information, so as to improve coverage performance.

FIG. 4 is a schematic flowchart of another method for sending scheduling information according to an example of the disclosure, executed by a network device. As shown in FIG. 4, the method for sending scheduling information includes steps S301-S303.

S301, receive channel state information sent from a terminal device.

In the examples of the disclosure, S301 may be implemented in any manner of the examples of the disclosure, which is not limited by the examples of the disclosure and will not be repeated here.

Next, in S302, generate scheduling information according to the channel state information. Where the scheduling information includes a current frequency hopping and an adjacent frequency hopping within a time unit, a carrier frequency of the current frequency hopping is not located in a coherent bandwidth of the adjacent frequency hopping, a vacant symbol is present in the time unit, a pilot signal configured on the vacant symbol and having a frequency the same as the carrier frequency of the current frequency hopping adjacent to the vacant symbol is used for channel estimation of the current frequency hopping, and/or a pilot signal configured on the vacant symbol and having a frequency the same as the carrier frequency of the adjacent frequency hopping adjacent to the vacant symbol is used for channel estimation of the adjacent frequency hopping.

In the examples of the disclosure, the type of the pilot signal is not limited. For instance, the pilot signal includes, but is not limited to, a demodulation reference signal (DMRS), a sounding reference signal (SRS), etc. Moreover, the type of the channel where the time unit is located is not limited either. For instance, the time unit may be a time unit in a physical uplink shared channel (PUSCH), and may also be a time unit in a physical uplink control channel (PUCCH), etc.

In the examples of the disclosure, a carrier frequency of the current frequency hopping is not located in a coherent bandwidth of the adjacent frequency hopping, when a vacant symbol is present in the time unit, a pilot signal configured on the vacant symbol and having a frequency the same as the carrier frequency of the current frequency hopping adjacent to the vacant symbol is used for channel estimation of the current frequency hopping, and/or the pilot signal configured on the vacant symbol and having a frequency the same as the carrier frequency of the adjacent frequency hopping adjacent to the vacant symbol is used for channel estimation of the adjacent frequency hopping. That is, one or two pilot signals may be configured on the vacant symbol, a frequency of the pilot signals is the same as a carrier frequency of the current frequency hopping adjacent to the vacant symbol, and/or a frequency of the pilot signal is the same as a carrier frequency of the adjacent frequency hopping adjacent to the vacant symbol, a pilot signal configured on the vacant symbol and having a frequency the same as the carrier frequency of the current frequency hopping adjacent to the vacant symbol may be used for channel estimation of the current frequency hopping, and/or the pilot signal configured on the vacant symbol and having a frequency the same as the carrier frequency of the adjacent frequency hopping adjacent to the vacant symbol may be used for channel estimation of the adjacent frequency hopping. In this way, by configuring the pilot signal on the vacant symbol, the vacant symbol in the time unit may be effectively used, which helps to save time-domain resources. Furthermore, the pilot signal configured on the vacant symbol may be used for channel estimation of the current frequency hopping and/or the adjacent frequency hopping.

In the examples of the disclosure, the number of frequency hopping in the time unit, the number of symbols occupied by each frequency hopping in the time unit, the number of vacant symbols in the time unit, etc. are not limited. It can be understood that at least 2 frequency hopping may be included in 1 time unit, the number of occupy symbols for each frequency hopping in the time unit is at least one, and the number of vacant symbols in the time unit may be 0, and may also be 1 or more.

Figure 5:
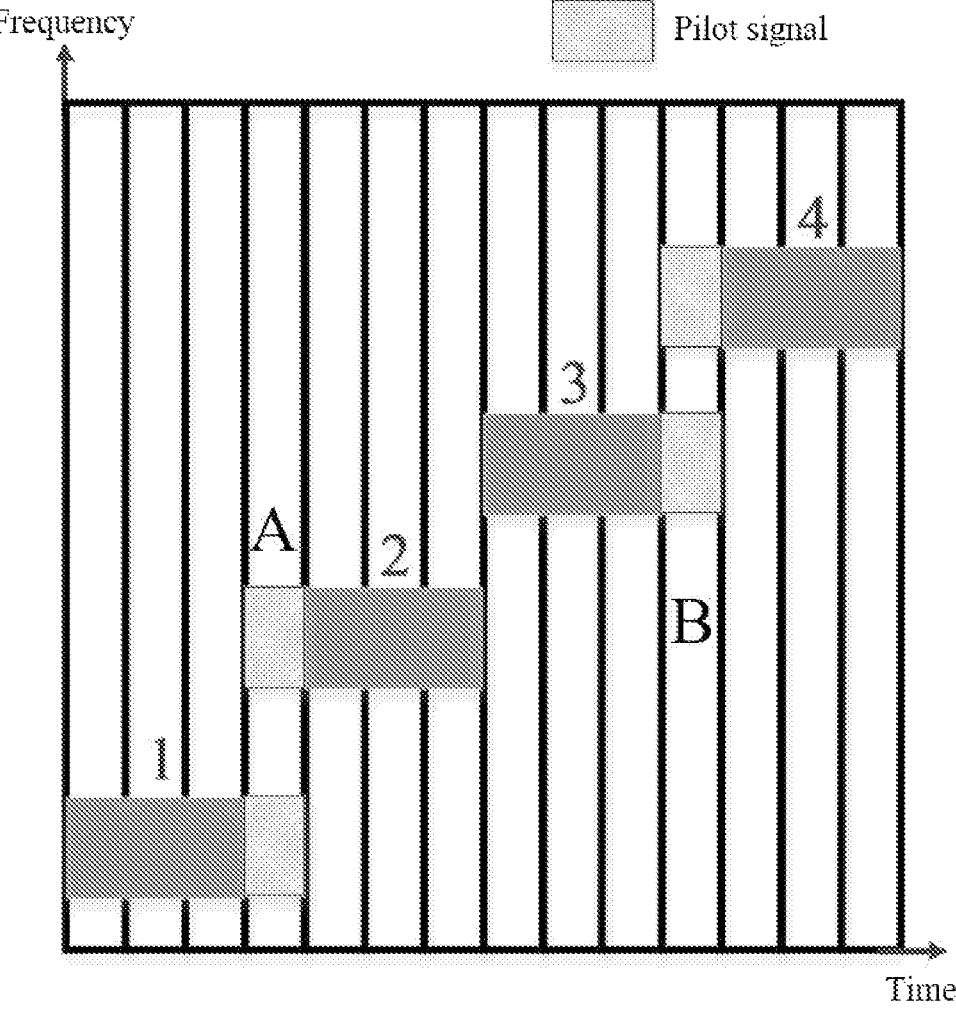
FIG. 5 is a schematic diagram of another method for sending scheduling information according to an example of the disclosure.

As shown in FIG. 5, with the frequency hopping in a Type A repetition mode in the time unit as an instance, one time unit may include 4 frequency hopping, which are frequency hopping 1 to 4 respectively, the number of occupy symbols for each frequency hopping in the time unit is 3, and the number of vacant symbols in the time unit is 2, which are vacant symbols A and B respectively. Assuming that a carrier frequency of each frequency hopping in the time unit is not located in a coherent bandwidth of an adjacent frequency hopping, and two pilot signals are separately configured on the vacant symbols A and B. The pilot signal configured on the vacant symbol A and having a frequency the same as a carrier frequency of the frequency hopping 1 is used for channel estimation of the frequency hopping 1. The pilot signal configured on the vacant symbol A and having a frequency the same as a carrier frequency of the frequency hopping 2 is used for channel estimation of the frequency hopping 2. The pilot signal configured on the vacant symbol B and having a frequency the same as a carrier frequency of the frequency hopping 3 is used for channel estimation of the frequency hopping 3. The pilot signal configured on the vacant symbol B and having a frequency the same as the carrier frequency of the frequency hopping 4 is used for channel estimation of the frequency hopping 4. In this way, each of the frequency hopping 1 to 4 corresponds to one pilot signal, and channel estimation may be performed by means of its own pilot signal.

In returning to the flow chart of FIG. 4, in S303, send the scheduling information to the terminal device.

In the examples of the disclosure, S303 may be implemented in any manner of the examples of the disclosure, which is not limited by the examples of the disclosure and will not be repeated here.

According to the method for sending scheduling information in the examples of the disclosure, the method includes: receiving channel state information sent from a terminal device; generating scheduling information according to the channel state information, where the scheduling information includes a current frequency hopping and an adjacent frequency hopping within a time unit, a carrier frequency of the current frequency hopping is not located in a coherent bandwidth of the adjacent frequency hopping, a vacant symbol is present in the time unit, a pilot signal configured on the vacant symbol and having a frequency the same as the carrier frequency of the current frequency hopping adjacent to the vacant symbol is used for channel estimation of the current frequency hopping, and/or a pilot signal configured on the vacant symbol and having a frequency the same as the carrier frequency of the adjacent frequency hopping adjacent to the vacant symbol is used for channel estimation of the adjacent frequency hopping; and sending the scheduling information to the terminal device. In this way, when the carrier frequency of the current frequency hopping is not located in the coherent bandwidth of the adjacent frequency hopping, by configuring the pilot signal on the vacant symbol, the vacant symbol in the time unit may be effectively used, which helps to save time-domain resources. Moreover, the pilot signal configured on the vacant symbol may be configured to channel estimation of the current frequency hopping and/or the adjacent frequency hopping.

FIG. 6 is a schematic flowchart of another method for receiving scheduling information according to an example of the disclosure, executed by a terminal device. As shown in FIG. 6, the method for receiving scheduling information includes steps S401-S403.

S401, send channel state information to a network device.

In the examples of the disclosure, S401 may be implemented in any manner of the examples of the disclosure, which is not limited by the examples of the disclosure and will not be repeated here.

Next, in S402, receive scheduling information sent from the network device. The scheduling information includes a current frequency hopping and an adjacent frequency hopping within a time unit, a carrier frequency of the current frequency hopping is not located in a coherent bandwidth of the adjacent frequency hopping, and a vacant symbol is present in the time unit.

In the examples of the disclosure, the terminal device may receive the scheduling information sent from the network device, where the scheduling information includes a current frequency hopping and an adjacent frequency hopping within a time unit, a carrier frequency of the current frequency hopping is not located in a coherent bandwidth of the adjacent frequency hopping, and a vacant symbol is present in the time unit.

In the examples of the disclosure, the type of the channel where the time unit is located is not limited either. For instance, the time unit may be a time unit in a physical uplink shared channel (PUSCH), and may also be a time unit in a physical uplink control channel (PUCCH), etc.

Finally, in S403, perform at least one of channel estimation on the current frequency hopping by using a pilot signal configured on the vacant symbol and having a frequency identical to the carrier frequency of the current frequency hopping adjacent to the vacant symbol, or channel estimation on the adjacent frequency hopping by using a pilot signal configured on the vacant symbol and having the frequency identical to the carrier frequency of the adjacent frequency hopping adjacent to the vacant symbol.

In the examples of the disclosure, the terminal device may perform channel estimation on the current frequency hopping by configuring a pilot signal configured on the vacant symbol and having a frequency the same as the carrier frequency of the current frequency hopping adjacent to the vacant symbol, and/or perform channel estimation on the adjacent frequency hopping by configuring the pilot signal configured on the vacant symbol and having a frequency the same as the carrier frequency of the adjacent frequency hopping adjacent to the vacant symbol. That is, one or two pilot signals may be configured on the vacant symbol, a frequency of the pilot signals is the same as a carrier frequency of the current frequency hopping adjacent to the vacant symbol, and/or a frequency of the pilot signal is the same as a carrier frequency of the adjacent frequency hopping adjacent to the vacant symbol. A pilot signal configured on the vacant symbol and having a frequency the same as the carrier frequency of the current frequency hopping adjacent to the vacant symbol may be used for channel estimation of the current frequency hopping, and/or the pilot signal configured on the vacant symbol and having a frequency the same as the carrier frequency of the adjacent frequency hopping adjacent to the vacant symbol may be used for channel estimation of the adjacent frequency hopping. In this way, by configuring the pilot signal on the vacant symbol, the vacant symbol in the time unit may be effectively used, which helps to save the time-domain resources. Furthermore, the pilot signal configured on the vacant symbol may be used for channel estimation of the current frequency hopping and/or the adjacent frequency hopping.

As shown in FIG. 5, with the frequency hopping in a Type A repetition mode in the time unit as an instance, one time unit may include 4 frequency hopping, which are frequency hopping 1 to 4 respectively, the number of occupy symbols for each frequency hopping in the time unit is 3, and the number of vacant symbols in the time unit is 2, which are vacant symbols A and B respectively. Assuming that a carrier frequency of each frequency hopping in the time unit is not located in a coherent bandwidth of an adjacent frequency hopping, and two pilot signals are separately configured on the vacant symbols A and B. The pilot signal configured on the vacant symbol A and having a frequency the same as a carrier frequency of the frequency hopping 1 may be used for channel estimation of the frequency hopping 1. The pilot signal configured on the vacant symbol A and having a frequency the same as a carrier frequency of the frequency hopping 2 may be used for channel estimation of the frequency hopping 2. The pilot signal configured on the vacant symbol B and having a frequency the same as a carrier frequency of the frequency hopping 3 may be used for channel estimation of the frequency hopping 3. The pilot signal configured on the vacant symbol B and having a frequency the same as the carrier frequency of the frequency hopping 4 may be used for channel estimation of the frequency hopping 4. In this way, each of the frequency hopping 1 to 4 corresponds to one pilot signal, and channel estimation may be performed by using the pilot signals corresponding to the frequency hopping separately.

According to the method for receiving scheduling information in the examples of the disclosure, the method includes: sending channel state information to a network device; receiving scheduling information sent from the network device, where the scheduling information includes a current frequency hopping and an adjacent frequency hopping within a time unit, a carrier frequency of the current frequency hopping is not located in a coherent bandwidth of the adjacent frequency hopping, and a vacant symbol is present in the time unit; and performing at least one of channel estimation on the current frequency hopping by using a pilot signal configured on the vacant symbol and having a frequency identical to the carrier frequency adjacent of the current frequency hopping adjacent to the vacant symbol, or channel estimation on the adjacent frequency hopping by using a pilot signal configured on the vacant symbol and having the frequency identical to the carrier frequency of the adjacent frequency hopping adjacent to the vacant symbol. In this way, by configuring the pilot signal on the vacant symbol, the vacant symbol in the time unit may be effectively used, which helps to save the time-domain resources. Furthermore, the pilot signal configured on the vacant symbol may be used for channel estimation of the current frequency hopping and/or the adjacent frequency hopping.

In correspondence to the methods for sending scheduling information provided in the above examples, the disclosure further provides an apparatus for sending scheduling information. The apparatus for sending scheduling information is performed by a network device. Since the apparatus for sending scheduling information provided in the examples of the disclosure corresponds to the method for sending scheduling information provided in the examples of FIGS. 1-2, an embodiment of the method for sending scheduling information is also applicable to the apparatus for sending scheduling information provided in this example, which will not be described in detail in this example.

Figure 7:
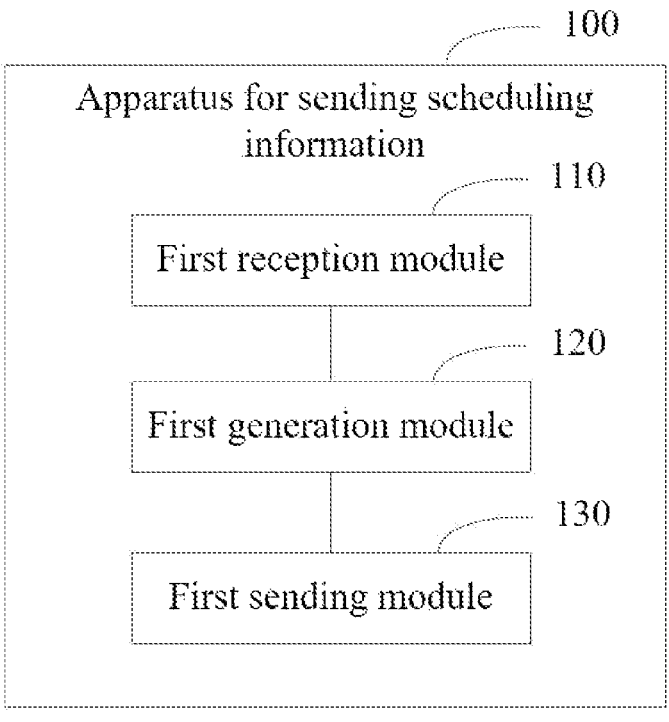
FIG. 7 is a schematic structural diagram of an apparatus for sending scheduling information according to an example of the disclosure.

FIG. 7 is a schematic structural diagram of an apparatus for sending scheduling information 100 according to an example of the disclosure. As shown in FIG. 7, the apparatus 100 for sending scheduling information includes a first reception module 110, a first generation module 120, and a first sending module 130.

The first reception module 110 is configured to receive channel state information sent from a terminal device.

The first generation module 120 is configured to generate scheduling information according to the channel state information. Where the scheduling information includes a current frequency hopping and an adjacent frequency hopping within a time unit, a carrier frequency of the current frequency hopping is located in a coherent bandwidth of the adjacent frequency hopping, and a pilot signal configured on the current frequency hopping or the adjacent frequency hopping is used for channel estimation of the current frequency hopping and/or the adjacent frequency hopping.

The first sending module 130 is configured to send the scheduling information to the terminal device.

The apparatus for sending scheduling information in the examples of the disclosure receives channel state information sent from a terminal device; generates scheduling information according to the channel state information, where the scheduling information includes a current frequency hopping and an adjacent frequency hopping within a time unit, a carrier frequency of the current frequency hopping is located in a coherent bandwidth of the adjacent frequency hopping, and a pilot signal configured on the current frequency hopping or the adjacent frequency hopping is used for channel estimation of the current frequency hopping and/or the adjacent frequency hopping; and sends the scheduling information to the terminal device. In this way, when a carrier frequency of the current frequency hopping is located in a coherent bandwidth of the adjacent frequency hopping, a pilot signal configured on the current frequency hopping or the adjacent frequency hopping is used for channel estimation of the current frequency hopping and/or the adjacent frequency hopping. That is, the current frequency hopping and the adjacent frequency hopping can share a pilot signal, which can effectively reduce the number of pilot signals and improve the transmission of data information, so as to improve coverage performance.

In correspondence to the methods for receiving scheduling information provided in the above examples, the disclosure further provides an apparatus for receiving scheduling information. The apparatus for receiving scheduling information is performed by a terminal device. Since the apparatus for receiving scheduling information provided in the examples of the disclosure corresponds to the method for receiving scheduling information provided in the examples of FIGS. 2-3, an embodiment of the method for receiving scheduling information is also applicable to the apparatus for receiving scheduling information provided in this example, which will not be described in detail in this example.

Figure 8:
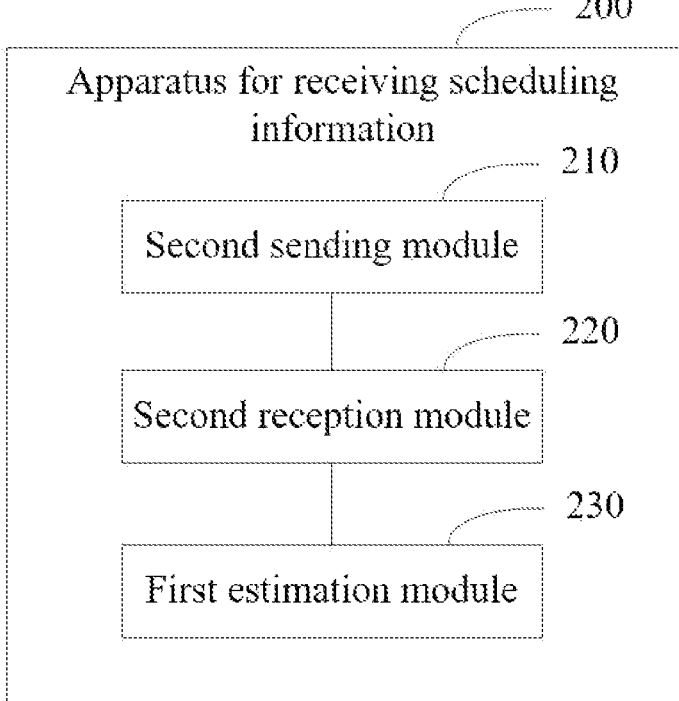
FIG. 8 is a schematic structural diagram of an apparatus for receiving scheduling information according to an example of the disclosure.

FIG. 8 is a schematic structural diagram of an apparatus for receiving scheduling information 200 according to an example of the disclosure. As shown in FIG. 8, the apparatus

200 for receiving scheduling information includes a second sending module 210, a second reception module 220 and a first estimation module 230.

The second sending module 210 is configured to send channel state information to a network device.

The second reception module 220 is configured to receive scheduling information sent from the network device. Where the scheduling information includes a current frequency hopping and an adjacent frequency hopping within a time unit, and a carrier frequency of the current frequency hopping is located in a coherent bandwidth of the adjacent frequency hopping.

The first estimation module 230 is configured to perform channel estimation on at least one of the current frequency hopping or the adjacent frequency hopping by using a pilot signal configured on the current frequency hopping or the adjacent frequency hopping.

The apparatus for receiving scheduling information in the examples of the disclosure sends channel state information to a network device; receives scheduling information sent from the network device, where the scheduling information includes a current frequency hopping and an adjacent frequency hopping within a time unit, and a carrier frequency of the current frequency hopping is located in a coherent bandwidth of the adjacent frequency hopping; and performs channel estimation on at least one of the current frequency hopping or the adjacent frequency hopping by using a pilot signal configured on the current frequency hopping or the adjacent frequency hopping. In this way, when a carrier frequency of the current frequency hopping is located in a coherent bandwidth of the adjacent frequency hopping, a pilot signal configured on the current frequency hopping or the adjacent frequency hopping is used for channel estimation of the current frequency hopping and/or the adjacent frequency hopping. That is, the current frequency hopping and the adjacent frequency hopping can share a pilot signal, which can effectively reduce the number of pilot signals and improve the transmission of data information, so as to improve coverage performance.

In correspondence to the methods for sending scheduling information provided in the above examples, the disclosure further provides another apparatus for sending scheduling information. The apparatus for sending scheduling information is performed by a network device. Since the apparatus for sending scheduling information provided in the examples of the disclosure corresponds to the method for sending scheduling information provided in the examples of FIGS. 4-5, an embodiment of the method for sending scheduling information is also applicable to the apparatus for sending scheduling information provided in this example, which will not be described in detail in this example.

Figure 9:
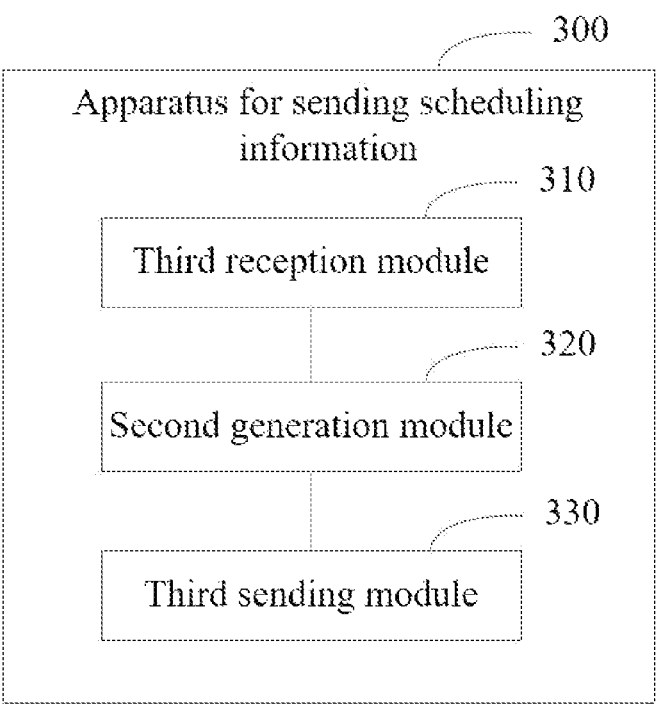
FIG. 9 is a schematic structural diagram of another apparatus for sending scheduling information according to an example of the disclosure.

FIG. 9 is a schematic structural diagram of another apparatus for sending scheduling information 300 according to an example of the disclosure. As shown in FIG. 9, the apparatus 300 for sending scheduling information includes a third reception module 310, a second generation module 320, and a third sending module 330.

The third reception module 310 is configured to receive channel state information sent from a terminal device.

The second generation module 320 is configured to generate scheduling information according to the channel state information. Where the scheduling information includes a current frequency hopping and an adjacent frequency hopping within a time unit, a carrier frequency of the current frequency hopping is not located in a coherent bandwidth of the adjacent frequency hopping, a vacant symbol is present in the time unit, a pilot signal configured on the vacant symbol and having a frequency the same as the carrier frequency of the current frequency hopping adjacent to the vacant symbol is used for channel estimation of the current frequency hopping, and/or the pilot signal configured on the vacant symbol and having a frequency the same as the carrier frequency of the adjacent frequency hopping adjacent to the vacant symbol is used for channel estimation of the adjacent frequency hopping.

The third sending module 330 is configured to send the scheduling information to the terminal device.

The apparatus for sending scheduling information in the examples of the disclosure receives channel state information sent from a terminal device; generates scheduling information according to the channel state information, where the scheduling information includes a current frequency hopping and an adjacent frequency hopping within a time unit, a carrier frequency of the current frequency hopping is not located in a coherent bandwidth of the adjacent frequency hopping, a vacant symbol is present in the time unit, a pilot signal configured on the vacant symbol and having a frequency the same as the carrier frequency of the current frequency hopping adjacent to the vacant symbol is used for channel estimation of the current frequency hopping, and/or the pilot signal configured on the vacant symbol and having a frequency the same as the carrier frequency of the adjacent frequency hopping adjacent to the vacant symbol is used for channel estimation of the adjacent frequency hopping; and sends the scheduling information to the terminal device. In this way, when the carrier frequency of the current frequency hopping is not located in the coherent bandwidth of the adjacent frequency hopping, by configuring the pilot signal on the vacant symbol, the vacant symbol in the time unit may be effectively used, which helps to save time-domain resources. Moreover, the pilot signal configured on the vacant symbol may be configured to channel estimation of the current frequency hopping and/or the adjacent frequency hopping.

In correspondence to the methods for receiving scheduling information provided in the above examples, the disclosure further provides another apparatus for receiving scheduling information. The apparatus for receiving scheduling information is performed by a terminal device. Since the apparatus for receiving scheduling information provided in the examples of the disclosure corresponds to the method for receiving scheduling information provided in the examples of FIGS. 5-6, an embodiment of the method for receiving scheduling information is also applicable to the apparatus for receiving scheduling information provided in this example, which will not be described in detail in this example.

Figure 10:
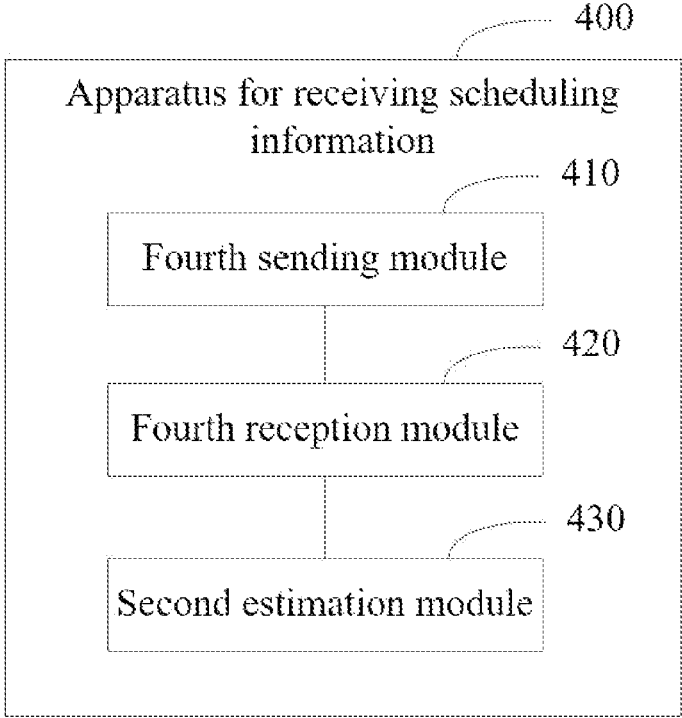
FIG. 10 is a schematic structural diagram of another apparatus for receiving scheduling information according to an example of the disclosure.

FIG. 10 is a schematic structural diagram of another apparatus for receiving scheduling information 400 according to an example of the disclosure. As shown in FIG. 10, the apparatus 400 for receiving scheduling information includes a fourth sending module 410, a fourth reception module 420 and a second estimation module 430.

The fourth sending module 410 is configured to send channel state information to a network device.

The fourth reception module 420 is configured to receive scheduling information sent from the network device. Where the scheduling information includes a current frequency hopping and an adjacent frequency hopping within a time unit, a carrier frequency of the current frequency hopping is not located in a coherent bandwidth of the adjacent frequency hopping, and a vacant symbol is present in the time unit.

The second estimation module 430 is configured to perform at least one of channel estimation on the current frequency hopping by using a pilot signal configured on the vacant symbol and having a frequency identical to the carrier frequency of the current frequency hopping adjacent to the vacant symbol, or channel estimation on the adjacent frequency hopping by using the pilot signal configured on the vacant symbol and having the frequency identical to the carrier frequency of the adjacent frequency hopping adjacent to the vacant symbol.

The apparatus for receiving scheduling information in the examples of the disclosure sends channel state information to a network device; receives scheduling information sent from the network device, where the scheduling information includes a current frequency hopping and an adjacent frequency hopping within a time unit, a carrier frequency of the current frequency hopping is not located in a coherent bandwidth of the adjacent frequency hopping, and a vacant symbol is present in the time unit; and performs at least one of channel estimation on the current frequency hopping by using a pilot signal configured on the vacant symbol and having a frequency identical to the carrier frequency of the current frequency hopping adjacent to the vacant symbol, or channel estimation on the adjacent frequency hopping by configuring the pilot signal configured on the vacant symbol and having the frequency identical to the carrier frequency of the adjacent frequency hopping adjacent to the vacant symbol. In this way, by configuring the pilot signal on the vacant symbol, the vacant symbol in the time unit may be effectively used, which helps to save the time-domain resources. Furthermore, the pilot signal configured on the vacant symbol may be used for channel estimation of the current frequency hopping and/or the adjacent frequency hopping.

According to the examples of the disclosure, the disclosure further provides a network device, including the apparatus 100 for sending scheduling information according to the examples of the disclosure, or the apparatus 300 for sending scheduling information according to the example of the disclosure.

The network device in the examples of the disclosure receives channel state information sent from a terminal device; generates the scheduling information according to the channel state information, where the scheduling information includes a current frequency hopping and an adjacent frequency hopping within a time unit, a carrier frequency of the current frequency hopping is located in a coherent bandwidth of the adjacent frequency hopping, and a pilot signal configured on the current frequency hopping or the adjacent frequency hopping is configured to channel estimation of the current frequency hopping and/or the adjacent frequency hopping; and sends the scheduling information to the terminal device. In this way, when a carrier frequency of the current frequency hopping is located in a coherent bandwidth of the adjacent frequency hopping, a pilot signal configured on the current frequency hopping or the adjacent frequency hopping is configured to channel estimation of the current frequency hopping and/or the adjacent frequency hopping. That is, the current frequency hopping and the adjacent frequency hopping can share a pilot signal, which can effectively reduce the number of pilot signals and improve the transmission of data information, so as to improve coverage performance.

According to the examples of the disclosure, the disclosure further provides a terminal device, including the apparatus 200 for receiving scheduling information according to the examples of the disclosure, or the apparatus 400 for receiving scheduling information according to the example of the disclosure.

The terminal device in the examples of the disclosure receives channel state information sent from a terminal device; generates the scheduling information according to the channel state information, where the scheduling information includes a current frequency hopping and an adjacent frequency hopping within a time unit, a carrier frequency of the current frequency hopping is not located in a coherent bandwidth of the adjacent frequency hopping, a vacant symbol is present in the time unit, a pilot signal configured on the vacant symbol and having a frequency the same as the carrier frequency of the current frequency hopping adjacent to the vacant symbol is used for channel estimation of the current frequency hopping, and/or the pilot signal configured on the vacant symbol and having a frequency the same as the carrier frequency of the adjacent frequency hopping adjacent to the vacant symbol is used for channel estimation of the adjacent frequency hopping; and sends the scheduling information to the terminal device. In this way, when the carrier frequency of the current frequency hopping is not located in the coherent bandwidth of the adjacent frequency hopping, by configuring the pilot signal on the vacant symbol, the vacant symbol in the time unit may be effectively used, which helps to save time-domain resources. Moreover, the pilot signal configured on the vacant symbol may be used for channel estimation of the current frequency hopping and/or the adjacent frequency hopping.

According to the examples of the disclosure, the disclosure further provides a communication apparatus and a readable storage medium.

Figure 11:
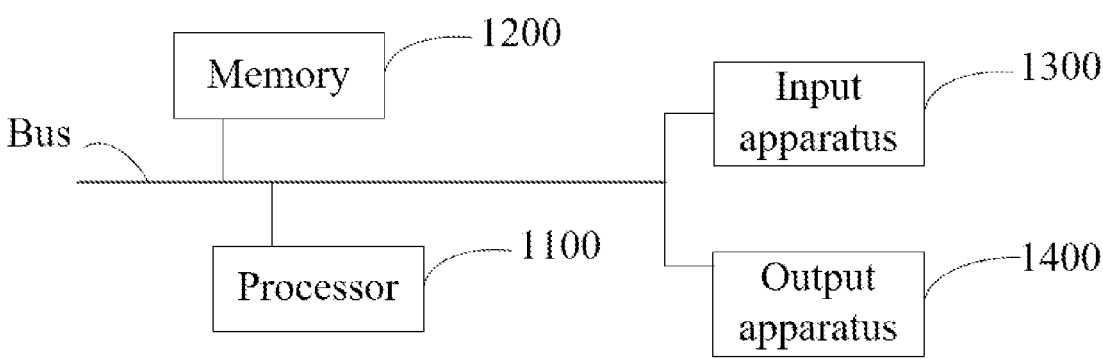
FIG. 11 is a schematic structural diagram of a communication apparatus according to an example of the disclosure.

FIG. 11 is a block diagram of a communication apparatus 1000 according to an example of the disclosure. The communication apparatus 1000 is intended to represent various forms of digital computers, for instance, laptops, desktops, workstations, personal digital assistants, servers, blade servers, mainframe computers, and other appropriate computers. The communication apparatus may also represent various forms of mobile devices, for instance, personal digital processing, cellular telephones, smart phones, wearable apparatuses, and other similar computing devices. The components shown here, their connections and relations, and their functions are meant to be instances merely, and are not meant to limit implementations of the disclosure described and/or claimed.

As shown in FIG. 11, the communication apparatus 1000 includes one or more processors 1100, a memory 1200, and interfaces for connecting various components, including a high-speed interface and a low-speed interface. The various components are interconnected by means of different buses, and may be mounted on a common motherboard or in other manners as desired. The processor may process an instruction executed in the communication apparatus 1000, and the instruction includes an instruction stored in or on the memory to display graphical information of a graphical user interface (GUI) on an external input/output apparatus (such as a display device coupled to an interface). In other embodiments, the plurality of processors and/or the plurality of buses may be used along with the plurality memories as desired. Similarly, a plurality of communication apparatuses may be connected, and individual devices provide portions of necessary operations (for instance, as a server array, a group of blade servers, or a multi-processor system). One processor 1100 is illustrated in FIG. 11.

The memory 1200 is the non-transitory computer-readable storage medium provided in the disclosure. The memory 1200 stores an instruction executable by at least one processor, to make the at least one processor 1100 execute the method for sending scheduling information provided in the disclosure. The non-transitory computer-readable storage medium in the disclosure stores a computer instruction, and the computer instruction make a computer execute the method for sending scheduling information provided in the disclosure.

The memory 1200, as a non-transitory computer-readable storage medium, may be configured to store a non-transitory software program, a non-transitory computer-executable program and a module, such as a program instruction/module corresponding to the method for sending scheduling information in the examples of the disclosure (for instance, the first reception module 110 shown in FIG. 5). The processor 1100 executes various functional applications and data processing of a server, that is, implements the method for sending scheduling information in the above method examples, by running a non-transitory software program, an instruction and a module stored in the memory 1200.

The memory 1200 may include a program storage area and a data storage area. The program storage area may store an operation system and an application program required by at least one function. The data storage area may store data created from the use of a positioning communication apparatus, etc. Moreover, the memory 1200 may include a high-speed random access memory, and may further include a non-transitory memory, for instance, at least one disk storage device, a flash memory device, or other non-transitory solid-state storage devices. Alternatively, the memory 1200 may include a memory remotely disposed with respect to the processor 1100, and the remote memory may be connected to the positioning communication apparatus by means of a network. Instances of networks described above include, but are not limited to, the Internet, enterprise intranets, local area networks, mobile communication networks, and their combinations.

The communication apparatus 1000 may further include an input apparatus 1300 and an output apparatus 1400. The processor 1100, the memory 1200, the input apparatus 1300, and the output apparatus 1400 may be connected by means of a bus or any other known manners. In FIG. 11, connection by means of a bus is taken as an example.

The input apparatus 1300 may receive input numeric or character information and generate key signal input related to user settings and function control of the positioning communication apparatus. The input apparatus 1300 may be, for instance, a touch screen, a keypad, a mouse, a trackpad, a touchpad, a pointing stick, one or more mouse buttons, a trackball, a joystick, etc. The output apparatus 1400 may include a display device, an auxiliary lighting apparatus (for instance, an LED), and a tactile feedback apparatus (for instance, a vibration motor), etc. The display apparatus may include, but is not limited to, a liquid crystal display (LCD), a light emitting diode (LED) display, and a plasma display. In some embodiments, the display apparatus may be a touch screen.

Various embodiments of the systems and techniques described here may be implemented in a digital electronic circuit system, an integrated circuit system, an application specific integrated circuit (ASIC), computer hardware, firmware, software, and/or their combinations. These embodiments may be implemented in one or more computer programs. The one or more computer programs are executable and/or interpretable on a programmable system including at least one programmable processor. The programmable processor may be a special or general purpose programmable processor, may receive data and instructions from a storage system, at least one input apparatus, and at least one output apparatus and transmits the data and instructions to the storage system, the at least one input apparatus, and the at least one output apparatus.

These computing programs (also known as programs, software, software applications or codes) include machine instructions for a programmable processor, and may be implemented in a high-level procedural and/or object-oriented programming language, and/or in assembly/machine language. As used here, the terms "machine-readable medium" and "computer-readable medium" refer to any computer program product, device and/or apparatus (for instance, a magnetic disc, an optical disk, a memory and programmable logic devices (PLDs)) configured to provide machine instructions and/or data for a programmable processor, including a machine-readable medium that receives a machine instruction as a machine-readable signal. The term "machine-readable signal" refers to any signal configured to provide the machine instruction and/or data for the programmable processor.

To provide interaction with a user, the systems and techniques described here may be implemented on a computer. The computer has: a display apparatus (for instance, a cathode ray tube (CRT) or a liquid crystal display (LCD) monitor) for displaying information to a user; and a keyboard and a pointing apparatus (for instance, a mouse or a trackball) by which the user can provide input for the computer. Other kinds of apparatuses may further be configured to provide interaction with a user. For instance, feedback provided for the user may be any form of sensory feedback (for instance, visual feedback, auditory feedback, or tactile feedback); and input from the user may be received in any form (including acoustic input, speech input, or tactile input).

The systems and techniques described here may be implemented in a computing system that includes a back-end component (for instance, as a data server), a computing system that includes a middleware component (for instance, an application server), a computing system that includes a front-end component (for instance, a user computer having a graphical user interface or a Web browser through which a user can interact with an embodiment of the systems and techniques described here), or any computing system that includes a combination of such back-end, middleware, or front-end components. The components of the system may be interconnected by any form or medium of digital data communication (for instance, a communication network). Instances of a communication network include a local area network (LAN), a wide area network (WAN), and the Internet.

The computer system may include a client and a server. The client and the server are generally remote from each other and typically interact by means of a communication network. A relation between the client and the server arises by means of computer programs running on the corresponding computers and having a client-server relationship with each other.

According to the method for sending scheduling information in the examples of the disclosure, the method includes: receive channel state information sent from a terminal device; generate scheduling information according to the channel state information, where the scheduling information includes a current frequency hopping and an adjacent frequency hopping within a time unit, a carrier frequency of the current frequency hopping is located in a coherent bandwidth of the adjacent frequency hopping, and a pilot signal configured on the current frequency hopping or the adjacent frequency hopping is used for channel estimation of the current frequency hopping and/or the adjacent frequency hopping; and send the scheduling information to the terminal device. In this way, when a carrier frequency of the current frequency hopping is located in a coherent bandwidth of the adjacent frequency hopping, a pilot signal configured on the current frequency hopping or the adjacent frequency hopping is used for channel estimation of the current frequency hopping and/or the adjacent frequency hopping. That is, the current frequency hopping and the adjacent frequency hopping can share a pilot signal, which can effectively reduce the number of pilot signals and improve the transmission of data information, so as to improve coverage performance.

It is to be understood that the various forms of the flows shown above may be used, with steps being reordered, added, or deleted. For instance, steps described in the disclosure may be performed in parallel, performed sequentially, or performed in a different order, as long as desired results of the technical solutions disclosed in the disclosure can be achieved, which is not limited here.

What is claimed is:

1. A method for sending scheduling information, performed by a network device, and comprising:
receiving channel state information sent from a terminal device;
generating the scheduling information according to the channel state information, wherein the scheduling information comprises a current frequency hopping and an adjacent frequency hopping within a time unit, a carrier frequency of the current frequency hopping is not located in a coherent bandwidth of the adjacent frequency hopping, a vacant symbol is present in the time unit, a pilot signal that is configured on the vacant symbol and has a frequency identical to the carrier frequency of the current frequency hopping adjacent to the vacant symbol is used for channel estimation on the current frequency hopping, and/or, a pilot signal that is configured on the vacant symbol and has a frequency identical to a carrier frequency of the adjacent frequency hopping adjacent to the vacant symbol is used for channel estimation on the adjacent frequency hopping; and
sending the scheduling information to the terminal device.

2. The method according to claim 1, wherein a pilot signal is configured on a symbol of the adjacent frequency hopping, and a pilot signal is not configured on a symbol of the current frequency hopping.

3. The method according to claim 2, wherein the time unit is a time unit in a physical uplink shared channel.

4. The method according to claim 1, wherein the time unit is a time unit in a physical uplink shared channel.

5. A method for receiving scheduling information, performed by a terminal device, and comprising:
sending channel state information to a network device;
receiving the scheduling information sent from the network device, wherein the scheduling information comprises a current frequency hopping and an adjacent frequency hopping within a time unit, a carrier frequency of the current frequency hopping is not located in a coherent bandwidth of the adjacent frequency hopping, and a vacant symbol is present in the time unit; and
performing at least one of channel estimation on the current frequency hopping by using a pilot signal configured on the vacant symbol and having a frequency identical to the carrier frequency of the current frequency hopping adjacent to the vacant symbol, or channel estimation on the adjacent frequency hopping by using a pilot signal configured on the vacant symbol and having the frequency identical to the carrier frequency of the adjacent frequency hopping adjacent to the vacant symbol.

6. The method according to claim 5, wherein the time unit is a time unit in a physical uplink shared channel.

7. A communication apparatus, comprising:
at least one processor; and
a memory communicatively connected to the at least one processor; wherein
the memory stores an instruction executable by the at least one processor, and an instruction is executed by the at least one processor, to make the at least one processor execute the method for sending the scheduling information according to claim 1.

8. The communication apparatus according to claim 7, wherein a pilot signal is configured on a symbol of the adjacent frequency hopping, and a pilot signal is not configured on a symbol of the current frequency hopping.

9. The communication apparatus according to claim 8, wherein the time unit is a time unit in a physical uplink shared channel.

10. The communication apparatus according to claim 7, wherein the time unit is a time unit in a physical uplink shared channel.

11. A non-transitory computer-readable storage medium storing a computer instruction, wherein the computer instruction is configured to make a computer execute the method for sending the scheduling information according to claim 1.

12. The non-transitory computer-readable storage medium according to claim 11, wherein a pilot signal is configured on a symbol of the adjacent frequency hopping, and a pilot signal is not configured on a symbol of the current frequency hopping.

13. The non-transitory computer-readable storage medium according to claim 11, wherein the time unit is a time unit in a physical uplink shared channel.

14. A communication apparatus, comprising:
at least one processor; and
a memory communicatively connected to the at least one processor; wherein
the memory stores an instruction executable by the at least one processor, and an instruction is executed by the at least one processor, to make the at least one processor execute the method for receiving the scheduling information according to claim 5.

15. The communication apparatus according to claim 14, wherein the time unit is a time unit in a physical uplink shared channel.

16. A non-transitory computer-readable storage medium storing a computer instruction, wherein the computer instruction is configured to make a computer execute the method for receiving the scheduling information according to claim 5.

17. The non-transitory computer-readable storage medium according to claim 16, wherein the time unit is a time unit in a physical uplink shared channel.

18. The non-transitory computer-readable storage medium according to claim 12, wherein the time unit is a time unit in a physical uplink shared channel.

* * * * *